US007421587B2

(12) United States Patent
Cowie et al.

(10) Patent No.: US 7,421,587 B2
(45) Date of Patent: Sep. 2, 2008

(54) DETECTING COMPUTER PROGRAMS WITHIN PACKED COMPUTER FILES

(75) Inventors: Neil Andrew Cowie, Aylesbury (GB); Igor Muttik, Berkhamsted (GB)

(73) Assignee: McAfee, Inc., Santa Clara, CA (US)

( * ) Notice: Subject to any disclaimer, the term of this patent is extended or adjusted under 35 U.S.C. 154(b) by 678 days.

(21) Appl. No.: 09/912,389

(22) Filed: Jul. 26, 2001

(65) Prior Publication Data

US 2003/0023865 A1    Jan. 30, 2003

(51) Int. Cl.
G06F 11/36 (2006.01)
H04L 9/28 (2006.01)

(52) U.S. Cl. .................... 713/188; 713/187; 726/23; 726/24

(58) Field of Classification Search ......... 713/187–188, 713/200; 726/23, 24
See application file for complete search history.

(56) References Cited

U.S. PATENT DOCUMENTS

| 5,359,659 | A | * | 10/1994 | Rosenthal ................... 726/24 |
| 5,440,723 | A | * | 8/1995 | Arnold et al. .................. 714/2 |
| 5,442,699 | A | * | 8/1995 | Arnold et al. ............... 713/188 |
| 5,473,769 | A | * | 12/1995 | Cozza ......................... 714/39 |
| 5,649,095 | A | * | 7/1997 | Cozza ......................... 714/39 |
| 5,812,848 | A | * | 9/1998 | Cohen ........................ 719/331 |
| 5,892,904 | A | * | 4/1999 | Atkinson et al. ............. 726/22 |
| 5,951,698 | A | * | 9/1999 | Chen et al. ................... 714/38 |
| 5,991,714 | A |   | 11/1999 | Shaner |
| 6,006,329 | A | * | 12/1999 | Chi ............................. 726/24 |
| 6,230,288 | B1 | * | 5/2001 | Kuo et al. .................... 714/38 |
| 6,269,456 | B1 | * | 7/2001 | Hodges et al. ............... 714/38 |
| 6,338,141 | B1 | * | 1/2002 | Wells .......................... 726/24 |
| 6,385,610 | B1 | * | 5/2002 | Deffler et al. ................. 707/6 |
| 6,577,920 | B1 | * | 6/2003 | Hypponen et al. .......... 700/200 |
| 6,851,057 | B1 | * | 2/2005 | Nachenberg ................. 726/24 |
| 6,971,019 | B1 | * | 11/2005 | Nachenberg ............... 713/188 |

(Continued)

FOREIGN PATENT DOCUMENTS

GB    2 365 158    2/2002

(Continued)

OTHER PUBLICATIONS

Pietrek, Matt "Peering Inside the PE: A Tour of the Win32 Portable Executable", 1994, Miller Freeman, Inc.*

(Continued)

Primary Examiner—Ayaz Sheikh
Assistant Examiner—Matthew T. Henning
(74) Attorney, Agent, or Firm—Zilka-Kotab, PC; Christopher J. Hamaty

(57) ABSTRACT

A technique for detecting Trojans and worms within packed computer files uses fingerprint data derived from the unpacked resource data associated with the packed computer files. The number of entries, the position within the resource data and size of the resource that is the largest resource specified, a timestamp value of compilation and a checksum value derived from the whole of the resource data may be included within a fingerprint value as characteristic of a particular set of resource data. A library of such fingerprint values may be generated for known Trojans and worms, or other programs it is wished to detect, and then a suspect file compared against this library of fingerprints.

61 Claims, 6 Drawing Sheets

U.S. PATENT DOCUMENTS

| | | | | |
|---|---|---|---|---|
| 6,980,992 B1 * | 12/2005 | Hursey et al. | ............... | 707/102 |
| 6,981,279 B1 * | 12/2005 | Arnold et al. | ................. | 726/22 |
| 7,032,114 B1 * | 4/2006 | Moran | ........................ | 713/187 |
| 7,043,757 B2 * | 5/2006 | Hoefelmeyer et al. | ......... | 726/24 |
| 7,131,036 B2 * | 10/2006 | Wray et al. | ................... | 714/38 |

FOREIGN PATENT DOCUMENTS

| | | | |
|---|---|---|---|
| GB | 2365158 A | * | 2/2002 |

OTHER PUBLICATIONS

Ször, Peter "Attacks on WIN32" Virus Bulletin Conference 1998, Virus Bulletin Ltd. pp. 57-84.*

Ször, Peter "Attacks on WIN32—Part II" Virus Bulletin Conference 2000, Virus Bulletin Ltd. pp. 47-68.*

Schneier, Bruce "Applied Cryptography, Second Edition", 1996 John Wiley and Sons, pp. 442-445.*

* cited by examiner

FINGERPRINT

A = 1 BYTE = CONTROL BYTE (SEE FIG. 4b)
B = 6 BYTES = ELIMINATION DATA (SEE FIG. 4c)
C = 1 BYTE = # ENTRIES PROCESSED
D = 8 BYTES = CHECKSUM

CONTROL BYTE

BITS 0 - 3 = RESERVED = 0
BITS 4 - 6 = 000 = RESERVED
          001 = ELIMINATION DATA IS CO-ORD / SIZE
          010 = ELIMINATION IS TIME STAMP
          011 = ELIMINATION IS FILE LENGTH
          100
          101
          110 } RESERVED
          111
BIT 7 = RESERVED = 0

DETECTING COMPUTER PROGRAMS WITHIN PACKED COMPUTER FILES

BACKGROUND OF THE INVENTION

1. Field of the Invention

This invention relates to the field of data processing systems. More particularly, this invention relates to the detection of known computer programs within packed computer files.

2. Description of the Prior Art

It is known to provide Win32 packers, such as UPX, PECrypt, PECompac, Neolite and Petite, that allow a file creator to compress/encrypt an executable files' contents and add a small program stub that decompresses/decrypts the file into memory when it is run. This saves upon data storage space and the transfer of data.

A side effect of the use of such packed files is that the detection of computer programs such as Trojans and worms is made more difficult as the compression/encryption has the effect of altering the internal structure and contents of the file thereby circumventing the normal anti-virus signature scanner techniques. One approach to dealing with this problem is to incorporate functionality within the anti-virus scanner that serves to decompress and decrypt packed files before scanning them. This approach whilst effective has the drawback that it adds disadvantageous additional complexity to the scanner and increases processing load. Furthermore, each time a new packer algorithm is developed, or slightly modified, then the anti-virus scanner needs a corresponding modification that is necessarily some time period behind.

SUMMARY OF THE INVENTION

Viewed from one aspect the present invention provides a computer program product comprising a computer program operable to control a computer to detect a known computer program within a packed computer file, said packed computer file being unpacked upon execution, said computer program comprising:

resource data reading logic operable to read resource data within said packed computer file, said resource data specifying program resource items used by said known computer program and being readable by a computer operating system without dependence upon which unpacking algorithm is used by said packed computer file; and resource data comparing logic operable to compare said resource data with characteristics of resource data of said known computer program to detect a match with said known computer program indicative of said packed computer file containing said known computer program.

The invention recognises that a packed file does not compress or encrypt the resource specifying data (e.g. a minimum subset of the resource header) as this typically needs to be accessed by the operating system of the computer when the file is being manipulated without it necessarily being executed and according unpacked. Furthermore, the independence of this resource specifying data from the pack/unpacking algorithm used allows it to be readily accessed by an anti-virus or other type of scanner. The invention also recognises that the resource specifying data is highly characteristic of the computer program to which it relates and can be used as an effective tool to identify specific known computer programs within packed files, even though the computer programs themselves may be disguised by the packing.

This ability to recognise known computer programs independent of the way in which they are packed is advantageous in a variety of circumstances, but is particularly useful when the files it is desired to detect are Trojan computer programs or worms computer programs.

Whilst the system could be provided to detect a single known computer program, it is very well suited to the type of scanner which detects any of a plurality of known computer programs within a packed computer file. This is the type of processing needed in a scanner looking for an instance of the large number of known Trojans or worms.

Whilst it would be possible to make direct comparisons between the resource data of a packed computer and the resource data for known computer programs, the efficiency, and resilience to minor changes in the resource data, is improved when the system processes the resource data to generate fingerprint data indicative of predetermined characteristics of the resource data and then comparisons are made between the fingerprint data from a suspect packed computer file and a library of fingerprint data of known computer programs.

The resource items specified within the resource data can take a variety of forms, but typically include one or more of icon data, string data, dialog data, bitmap data, menu data and language data.

Each resource is usually specified in terms of its relative position within the computer file and the size of the resource.

The fingerprint data could be generated in many different ways and include a variety of different characteristics. In preferred embodiments the fingerprint data includes a checksum value calculated in dependence upon a number of program resource items specified between each node within a hierarchical arrangement of resource data, string names and resource sizes.

The checksum may be calculated with a rotation between the adding in of each value in order to yield some order dependence in the checksum value.

The fingerprint data may also advantageously include in preferred embodiments an indication of the number of program resource items specified within the resource data, a location of the resource item having the largest size and the size of that resource item.

As an additional or alternative feature, the fingerprint data may also include a time stamp specifying the time of compilation of the computer file within the packed computer file.

It may be that one particular selection of characteristics to be included within the fingerprint data could be insufficiently specific to the computer program concerned and accordingly the system includes the possibility of more than one type of fingerprint data being used, the type concerned in a particular case being specified by a flag within the fingerprint data.

Whilst the invention is applicable to a wide variety of different system environments, operating systems and the like, it is particularly well suited for use when the packed computer file is a Win32 PE (portable executable) file of the type that may be executed in a Windows 95, Windows 98, Windows Millennium, Windows NT, Windows 2000 or Windows XP environment.

Complementary aspects of the invention also provide a computer program for generating characteristic data for identifying the resource data of a packed computer file together with methods and computer apparatuses in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
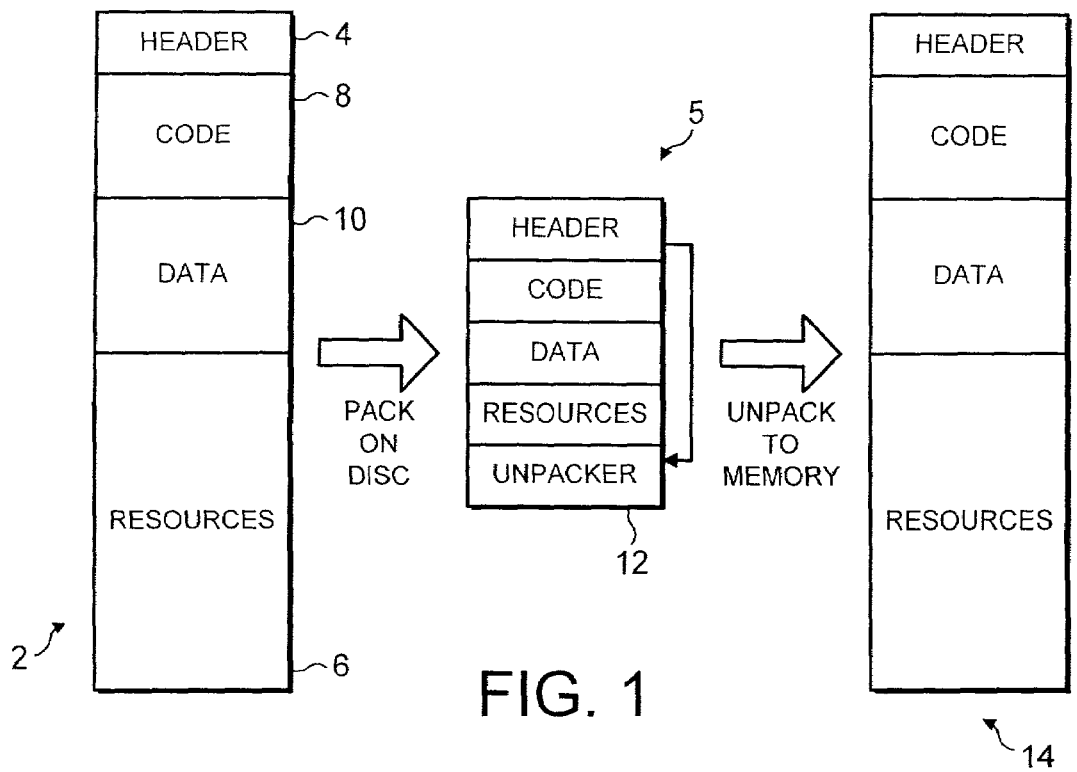
FIG. 1 schematically illustrates a computer file being packed and unpacked.

FIG. 1 illustrates a Win32 PE computer file of the type which may be executed by the Windows 95, Windows 98, Windows Millennium, Windows NT, Windows 2000 or Windows XP base computer systems. This computer program file 2 includes a header 4 that specifies the program resource items 6 associated with the computer program. The computer program 2 also includes executable code 8 and data 10. When the computer program 2 is packed using one of several known packing algorithms, then a packed computer file 5 is generated. In order that the operating system can properly deal with the packed computer file 5, the header 4 is not packed such that it is accessible to the operating system. The code 8, data 10 and resources 6 portions are compressed or encrypted in accordance with a packing algorithm. An unpacking computer program 12 is included within the packed computer file 5 and is executed when the packed computer file is executed so as to unpack the code 8, data 10 and resources 6 portion when execution is desired and regenerate the computer file 14 in the computer memory.

It will be appreciated that the code 8, data 10 and resources 6 may represent a computer program of any type. The computer program may be a Trojan or worm developed by a malicious person or organisation and which a user wishes to detect on their system even if it is disguised by packing. The computer program could have other forms, which it is also desired to detect, such as a computer program that is legitimate in some circumstances but that it is desired to detect in this particular situation, e.g. banned games on a business computer system.

Figure 2:
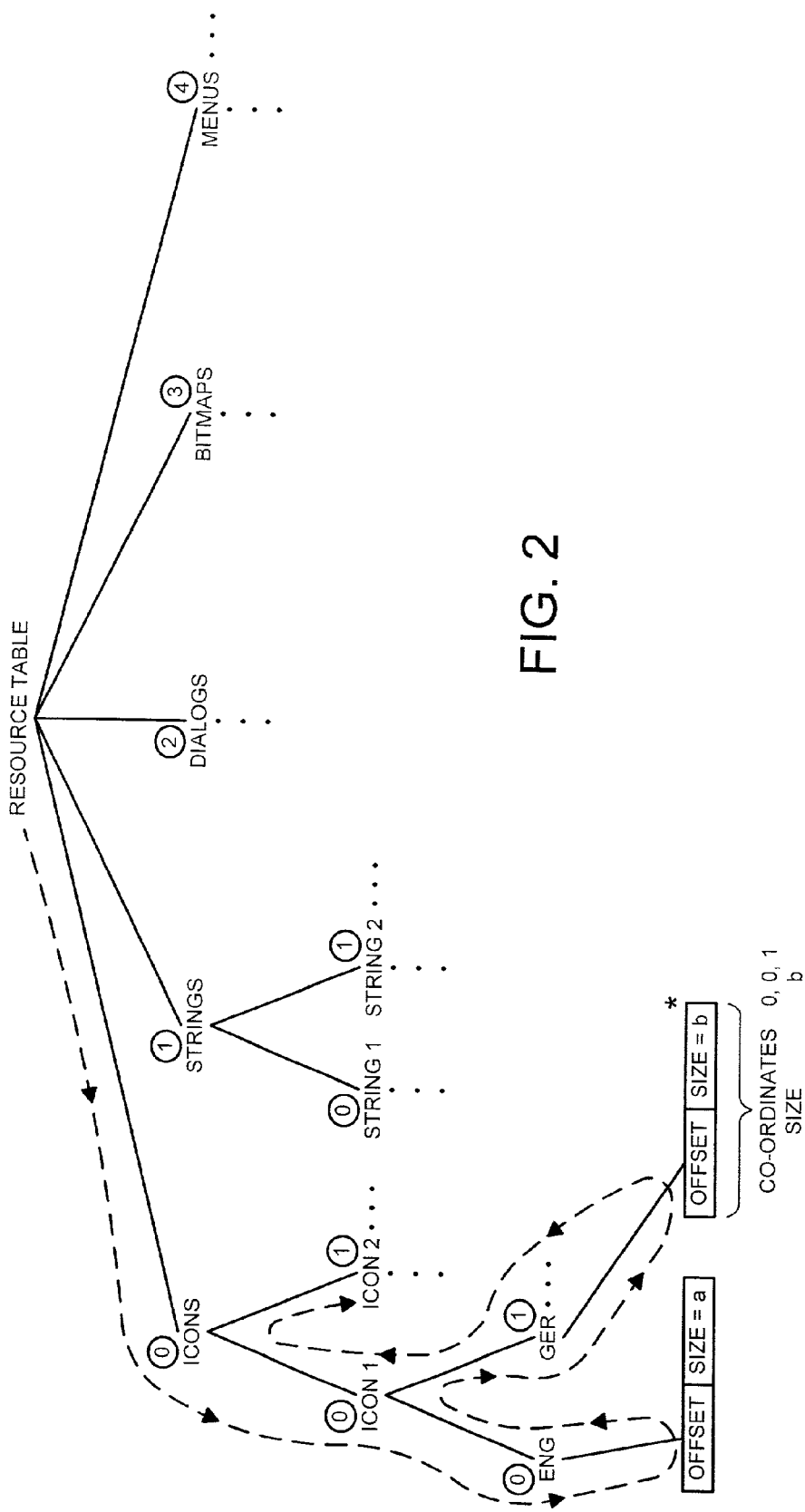
FIG. 2 schematically illustrates hierarchically arranged resource data specifying program resource items.

FIG. 2 schematically illustrates the hierarchical organisation of resource data within a Win32 PE file. The arrangement and format of this data is known and published in order to allow application developers to develop computer programs for use on Microsoft Corporation Windows operating systems of the above mentioned types. At the first level, different types of resources such as icons, strings, dialogues, bitmaps, menus and the like, are defined. At a second level, one or more different instances of that particular type of program resource is specified. At the third level, one or more variants of each instance are specified with an offset value being given pointing to the location of that resource within the resource data 6 together with the size of that resource. If each of the nodes within the hierarchy is given a number specifying its order of appearance beneath the node or above it, then this three-deep hierarchy can have any point within it defined by three co-ordinates. In the example illustrated, the program resource item marked with an "*" has co-ordinates within the hierarchy of "0,0,1" and a size of "b".

Fingerprint data characteristic of the resource data of FIG. 2 is generated for the purpose of rapid and robust identification of computer programs from their associated resource data. The fingerprint data can include variables such as the number of program resource items specified by the resource data and a time stamp value corresponding to the compilation time of the computer program concerned that is given within the resource specifying data at the start of that data in accordance with the known format. Another characteristic of the resource data that tends to be highly individual to a computer program is the co-ordinate position of the resource item having the largest specified size within the hierarchy together with the size value of that resource data.

A characteristic checksum value can also be calculated by parsing through the hierarchy. In particular, the checksum value can add in the number of resource items specified beneath each node within the hierarchy as the hierarchy is progressively traversed by tracking down each path to the lowest point within the hierarchy and then tracing back to the closest un-taken path and then tracking down that path. This parsing path is schematically illustrated by the dotted line in FIG. 2.

As well as adding in the number of items to the checksum as described above, the checksum may also add in the ASC II values of any strings naming particular resource items that are encountered during this parsing. Furthermore, the size values encountered for each resource as specified at the bottom level within the hierarchy may be added into the checksum.

Figure 3:
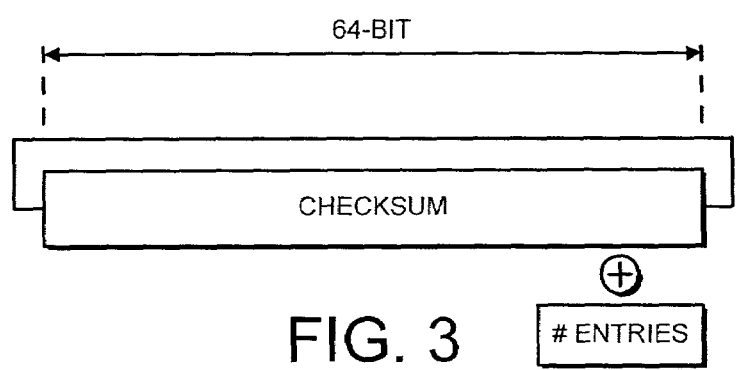
FIG. 3 schematically illustrates the generation of a checksum value for use within fingerprint data.

FIG. 3 schematically illustrates the format of the checksum value. The checksum is generated whilst "walking" the resource tree structure, and is composed of the following elements in the resource section header . . .

1) The total number of entries contained in each node of the tree

2) The size of each individual resource item

3) The ASCII string name of any resource item that has a name ID.

These items are combined into the 64 bit checksum accumulator with a 32 bit XOR operation on the lower 32 bits of the checksum accumulator. After every XOR operation the checksum accumulator is rotated 1 bit to the left in order to provide an order dependence to the checksum value.

Figure 4A:
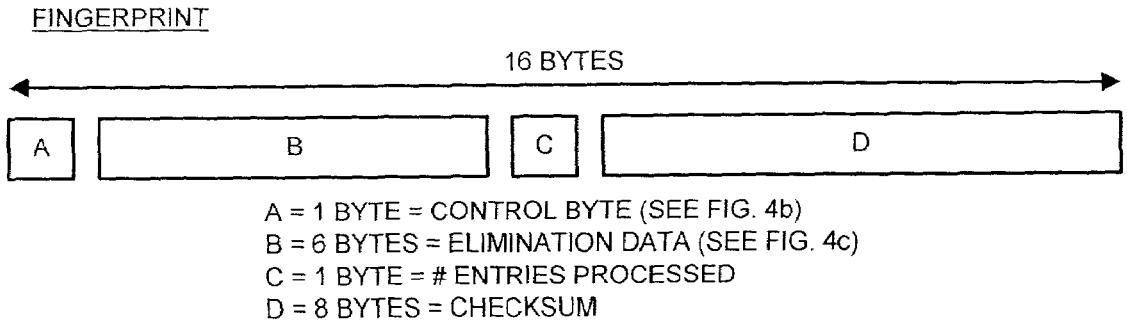
FIGS. 4a, 4b and 4c schematically illustrate three types of fingerprint data.
Figure 4B:
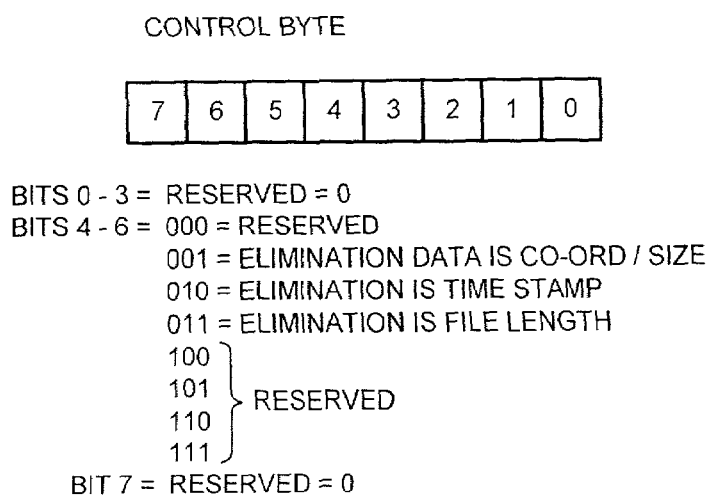
Figure 4C:
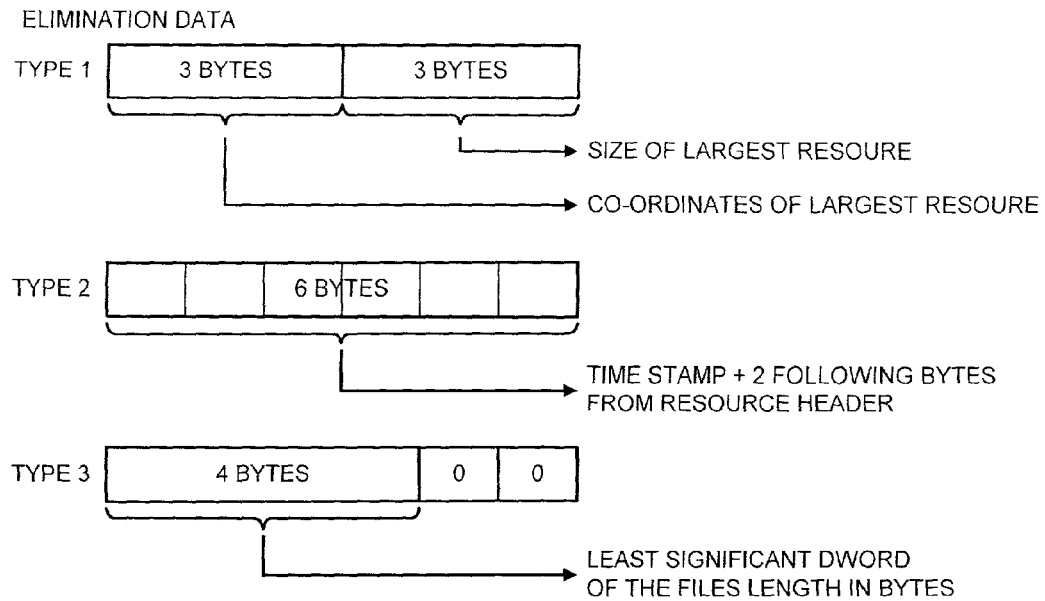

FIGS. 4a, 4b and 4c illustrate three different types of fingerprint values that may be employed. All three types of fingerprint are 16 bytes in length. The first byte is a control byte that indicates which type of elimination data is specified within that fingerprint. The next six bytes specify the elimination data. The following one byte specifies the number of entries processed in calculating the checksum. The final eight bytes specify the checksum itself.

FIG. 4a illustrates the fingerprint format.

FIG. 4b illustrates the control byte. Bits 4, 5 and 6 comprise a 3-bit field specifying the elimination data type as being one of co-ordinate/size data, timestamp data or file length data. Bits 0, 1, 2, 3, and 7 are reserved.

FIG. 4c illustrates the different elimination data formats for the three different types of fingerprint. Type 1 is the primary type of fingerprint employed. Type 1 fingerprints specify the number of entries within the hierarchical resource data, the co-ordinates of the largest resource, the size of the largest resource and the checksum value. The first three items in this fingerprint are indicative of the computer file concerned, but are not generally as highly specific as the checksum value. The main reason for the inclusion of the first three items within the fingerprint is to provide a mechanism for rapid elimination of fingerprints as non-matching when conducting a search through a large number of potential fingerprints. These three items of data may be used to hash into a large table of fingerprints to reduce the number of candidate fingerprints that need to be searched and thereby increase the processing speed. The checksum value tends to be highly specific to a particular collection of resource data and may be a 64-bit checksum number as discussed above or a 32-bit checksum number in less sophisticated systems.

In some circumstances the Type 1 fingerprint may not be sufficiently specific to a particular computer program. It may be that the particular computer program concerned is very simple and has few resources to characterise it, or it may be that it has been deliberately written to try and mask its uniqueness. In these circumstances, and in order to provide resistance against false alarm detections, a Type 2 fingerprint is provided for alternative use. A Type 2 fingerprint specifies a timestamp and the following two bytes in the resource data, instead of the co-ordinates of the largest resource and the size of the largest resource.

In some circumstances a Type 2 fingerprint may also not be sufficiently specific to characterise a file for elimination purposes and accordingly Type 3 fingerprints are also provided. Type 3 fingerprints specify as their elimination data four bytes corresponding to the least significant double word of the file's length. The remaining two bytes of the elimination data are 0.

The three different types of elimination data respectively specified within Type 1, Type 2 and Type 3 fingerprints provide a hierarchy of alternatives for use in providing effective elimination data. The control byte at the start of the fingerprint specifies the elimination data type and accordingly the fingerprint type.

Figure 5:
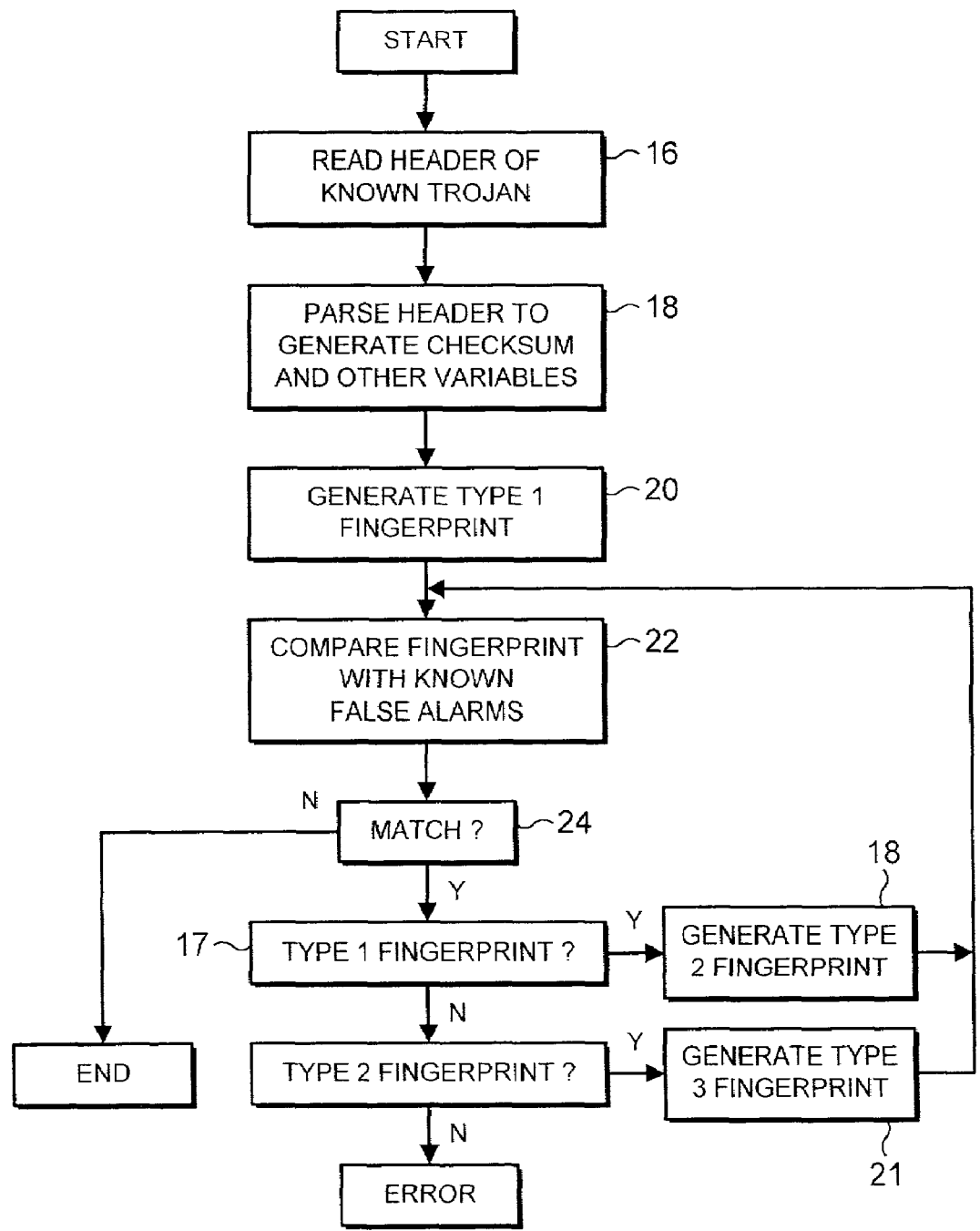
FIG. 5 is a flow diagram illustrating the generation of fingerprint data.

FIG. 5 illustrates the generation of fingerprint data for a known Trojan computer program. At step 16, the header 4 of the Trojan computer program is read. At step 18, this header 4 specifying the program resource items is parsed to generate the checksum value to be used within the fingerprint data and other variables such as the co-ordinates and size of the largest resource, the timestamp value of compilation and the image size are recorded. At step 20, a Type 1 fingerprint is created. At step 22, this Type 1 fingerprint is compared with a collection of fingerprints known to give false alarms as they correspond to genuine computer programs that are not Trojans and which it is not desired to detect. If step 24 indicates that the Type 1 fingerprint does not match any of the known false alarms, then the process terminates. Alternatively, processing proceeds to step 17 at which a test is made as to whether or not the fingerprint that was compared at steps 22 and 24 was a Type 1 fingerprint. If the fingerprint compared was a Type 1 fingerprint, then processing proceeds to step 18 at which a Type 2 fingerprint is generated and processing returned to step 22. If the test at step 17 indicated that a Type 1 fingerprint had not just been tested and failed, then processing proceeds to step 19. Step 19 tests as to whether or not the fingerprint just tested at steps 22 and 24 was a Type 2 fingerprint. If the fingerprint tested at steps 22 and 24 was a Type 2 fingerprint, then processing proceeds to step 21 at which a Type 3 fingerprint is generated prior to returning to step 22. If the test at step 19 indicated that the fingerprint tested at steps 22 and 24 was not a Type 2 fingerprint, then it must have been a Type 3 fingerprint and accordingly none of the fingerprints has been able to distinguish the Trojan from the known false alarm fingerprints and an error is generated at step 28.

Figure 6:
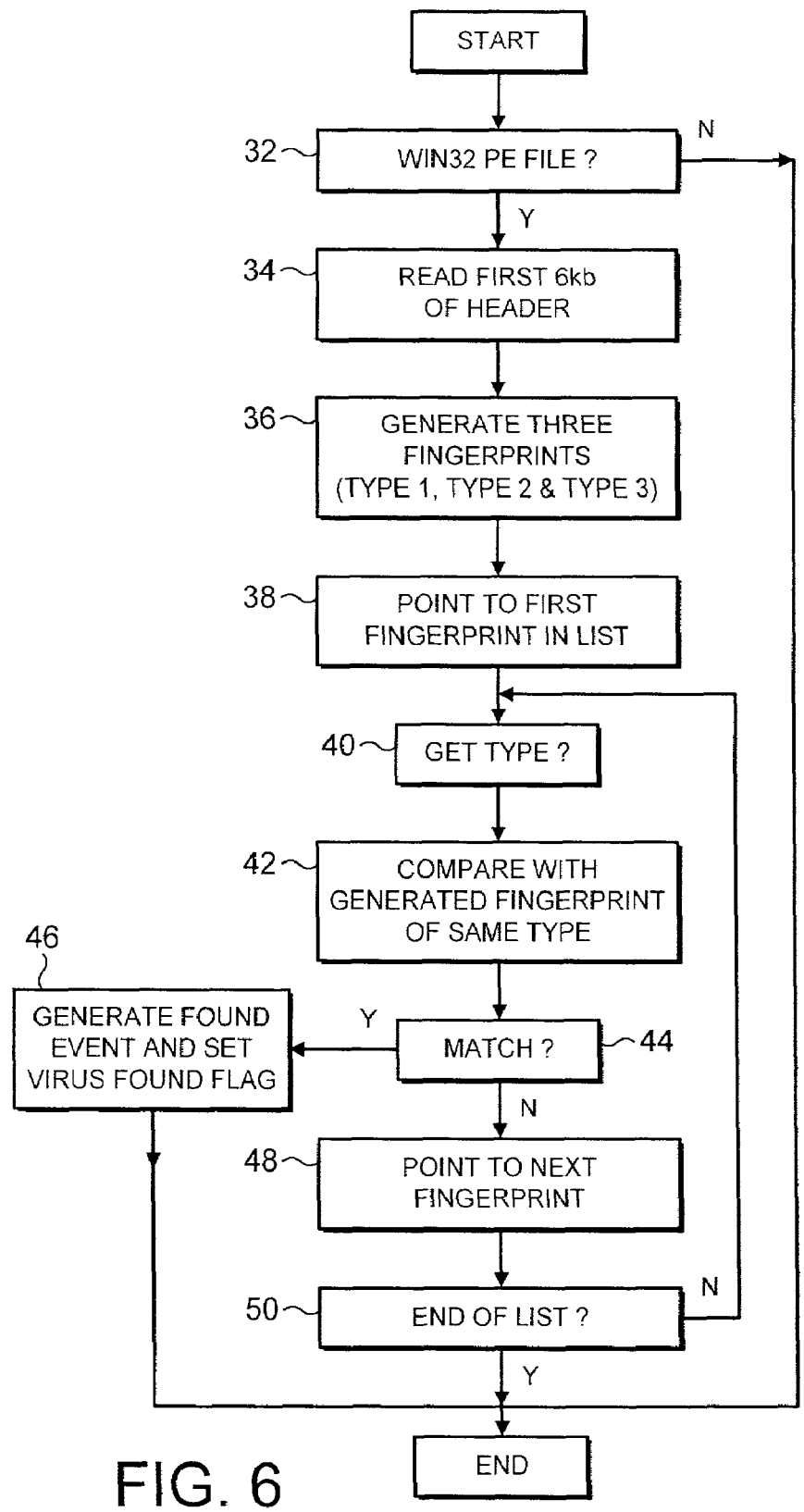
FIG. 6 is a flow diagram illustrating the scanning of a packed computer file to determine if it contains one of a plurality of known computer programs.

FIG. 6 is a flow diagram illustrating the scanning of a suspect packed computer file. At step 32 a determination is made as to whether the computer file is a Win32 PE file. If the computer file is not of this type, then processing terminates. If the computer file is a Win32 PE file, then step 32 serves to read the first 6 kb of the suspect file, which should include all of the header resource section. This first portion of the file is stored in memory so as to be available for rapid use and processing.

At step 36 fingerprints of all three different types are generated from the read data and stored within memory so as to be available for rapid use. At step 38 the first fingerprint within the list of fingerprints of known computer programs it is wished to detect is selected. At step 40 the type of the fingerprint being pointed to is read. At step 42 the fingerprint being pointed to is compared with the corresponding fingerprint of the same type generated for the suspect file at step 36. Step 40 determines whether or not a match was detected at step 42. If there is a match, then step 46 generates a "found event" and the virus found flag is set such that anti-virus (in this case anti-Trojan or worm) action is initiated.

If step 44 did not detect a match, then processing proceeds to step 48 at which the next fingerprint in the list of fingerprints to be detected is pointed to. Step 50 then determines whether the end of the list of fingerprints has been reached. If the end of the list of fingerprints has not been reached, then processing is returned to step 40. If the end of the list of fingerprints has been reached, then the processing terminates.

Figure 7:
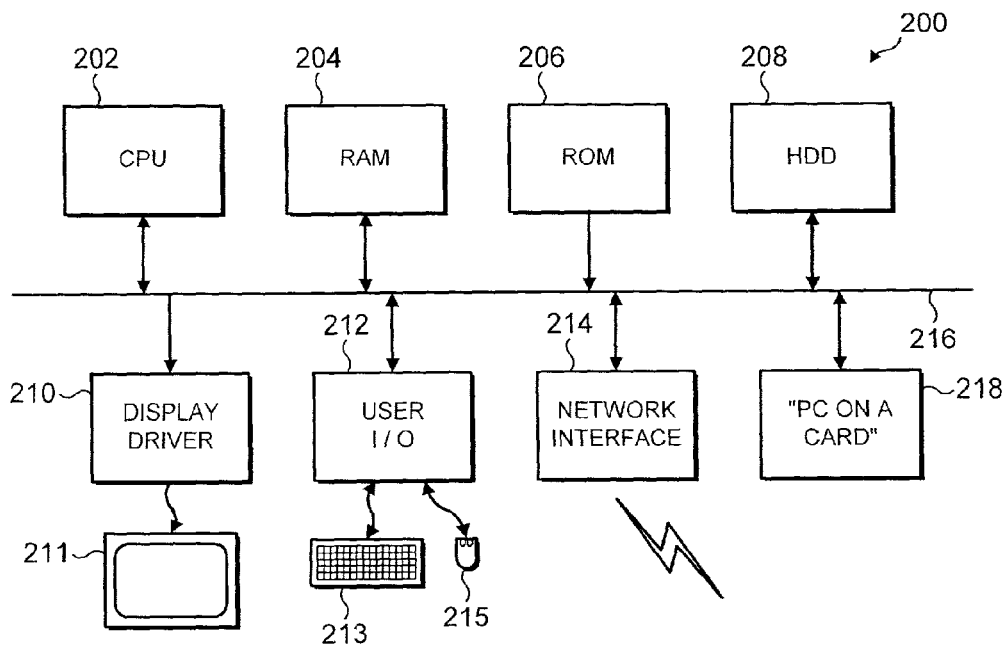
FIG. 7 schematically illustrates a general purpose computer of the type that may be used to implement the above techniques.

FIG. 7 illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can cooperate with the other elements in FIG. 4 via the system bus 216. The system bus 216 is a comparatively high bandwidth connection allowing rapid and efficient communication.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product in a computer storage medium comprising a computer program operable to control a computer to detect a known computer program within a packed computer file, said packed computer file being unpacked upon execution, said computer program comprising:

resource data reading logic for reading resource data within said packed computer file, said resource data specifying program resource items used by said known computer program and readable by a computer operating system without dependence upon which unpacking algorithm is used by said packed computer file; and resource data comparing logic for generating characteristics of said resource data and for comparing said characteristics of said resource data with characteristics of known computer program resource data and for detecting a match with said known computer program indicative of said packed computer file containing said known computer program;

wherein said resource data of said packed computer file is processed to generate fingerprint data and to compare said generated fingerprint data with known computer program fingerprint data;

wherein said generated fingerprint data includes a number of program resource items specified within said resource data of said packed computer file;

wherein said generated fingerprint data includes a flag indicating which data is included within said generated fingerprint data;

wherein said generated fingerprint data includes a location within said resource data of said packed computer file of an entry specifying a program resource item having a largest size;

wherein said generated fingerprint data includes a checksum value calculated in dependence upon:

a number of said program resource items specified beneath each node within hierarchically arranged resource data of said packed computer file;

string names associated with said program resource items within said resource data of said packed computer file; and sizes of said program resource items within said resource data of said packed computer file;

wherein said checksum value is rotated between each item being added into said checksum.

2. A computer program product as claimed in claim 1, wherein said known computer program is one of:
a Trojan computer program; and
a worm computer program.

3. A computer program product as claimed in claim 1, wherein said resource data comparing logic is operable to compare said resource data of said packed computer file with characteristics of a plurality of known computer programs to detect if said packed computer file contains one of said plurality of known computer programs.

4. A computer program product as claimed in claim 1, wherein said program resource items used by said known computer program include one or more of:
icon data;
string data;
dialog data;
bitmap data;
menu data; and
language data.

5. A computer program product as claimed in claim 1, wherein said resource data of said packed computer file specifies for each resource item a storage location of said resource item.

6. A computer program product as claimed in claim 5, wherein said storage location of said resource item is specified as an relative offset value.

7. A computer program product as claimed in claim 1, wherein said resource data of said packed computer file specifies for each resource item a size of said resource item.

8. A computer program product as claimed in claim 1, wherein said generated fingerprint data includes timestamp data indicative of a time of compilation of said known computer program.

9. A computer program product as claimed in claim 1, wherein said packed computer file includes an unpacking computer program which upon execution decompresses said known computer program.

10. A computer program product as claimed in claim 1, wherein said packed computer file is a Win32 PE file.

11. A computer program product as claimed in claim 1, wherein said checksum value is rotated 1 bit to the left.

12. A computer program product in a computer storage medium comprising a computer program operable to control a computer to generate data for detecting a known computer program within a packed computer file, said packed computer file being unpacked upon execution, said computer program comprising:

resource data reading logic for reading resource data within said packed computer file, said resource data specifying program resource items used by said known computer program and readable by a computer operating system without dependence upon which unpacking algorithm is used by said packed computer file; and characteristic data generating logic for generating characteristic data associated with said resource data for comparison with characteristic data of known computer program resource data to detect a match with said known computer program indicative of said packed computer file containing said known computer program;

wherein said resource data of said packed computer file is processed to generate fingerprint data and to compare said generated fingerprint data with known computer program fingerprint data;

wherein said generated fingerprint data includes a number of program resource items specified within said resource data of said packed computer file;

wherein said generated fingerprint data includes a flag indicating which data is included within said generated fingerprint data;

wherein said generated fingerprint data includes a location within said resource data of said packed computer file of an entry specifying a program resource item having a largest size;

wherein said generated fingerprint data includes a checksum value calculated in dependence upon:

a number of program resource items specified beneath each node within hierarchically arranged resource data of said packed computer file;

string names associated with program resource items within said resource data of said packed computer file; and sizes of program resource items within said resource data of said packed computer file;

wherein said checksum value is rotated between each item being added into said checksum.

13. A computer program product as claimed in claim 12, wherein said known computer program is one of:
a Trojan computer program; and
a worm computer program.

14. A computer program product as claimed in claim 12, wherein said characteristic data generating logic is operable to generate characteristic data from a plurality of known computer programs to enable detection of any of said plurality of known computer programs within said packed computer file.

15. A computer program product as claimed in claim 12, wherein said program resource items used by said known computer program include one or more of:
  icon data;
  string data;
  dialog data;
  bitmap data;
  menu data; and
  language data.

16. A computer program product as claimed in claim 12, wherein said resource data of said packed computer file specifies for each resource item a storage location of said resource item.

17. A computer program product as claimed in claim 16, wherein said storage location of said resource item is specified as an relative offset value.

18. A computer program product as claimed in claim 12, wherein said resource data of said packed computer file specifies for each resource item a size of said resource item.

19. A computer program product as claimed in claim 12, wherein said generated fingerprint data includes timestamp data indicative of a time of compilation of said known computer program.

20. A computer program product as claimed in claim 12, wherein said packed computer file includes an unpacking computer program which upon execution decompresses said known computer program.

21. A computer program product as claimed in claim 12, wherein said packed computer file is a Win32 PE file.

22. A method of controlling a computer to detect a known computer program within a packed computer file, said packed computer file being unpacked upon execution, said method comprising the steps of:
  reading resource data within said packed computer file, said resource data specifying program resource items used by said known computer program and readable by a computer operating system without dependence upon which unpacking algorithm is used by said packed computer file; and
  generating characteristics of said resource data and comparing said characteristics of said resource data with characteristics of known computer program resource data and detecting a match with characteristics of said known computer program indicative of said packed computer file containing said known computer program;
  wherein said resource data of said packed computer file is processed to generate fingerprint data and to compare said generated fingerprint data with known computer program fingerprint data;
  wherein said generated fingerprint data includes a number of program resource items specified within said resource data of said packed computer file;
  wherein said generated fingerprint data includes a flag indicating which data is included within said generated fingerprint data;
  wherein said generated fingerprint data includes a location within said resource data of said packed computer file of an entry specifying a program resource item having a largest size;
  wherein said generated fingerprint data includes a checksum value calculated in dependence upon:
  a number of program resource items specified beneath each node within hierarchically arranged resource data of said packed computer file;
  string names associated with program resource items within said resource data of said packed computer file; and
  sizes of program resource items within said resource data of said packed computer file;
  wherein said checksum value is rotated between each item being added into said checksum.

23. A method as claimed in claim 22, wherein said known computer program is one of:
  a Trojan computer program; and
  a worm computer program.

24. A method as claimed in claim 22, wherein said step of comparing compares said resource data of said packed computer file with characteristics of a plurality of known computer programs to detect if said packed computer file contains one of said plurality of known computer programs.

25. A method as claimed in claim 22, wherein said program resource items used by said known computer program include one or more of:
  icon data;
  string data;
  dialog data;
  bitmap data;
  menu data; and
  language data.

26. A method as claimed in claim 22, wherein said resource data of said packed computer file specifies for each resource item a storage location of said resource item.

27. A method as claimed in claim 26, wherein said storage location of said resource item is specified as an relative offset value.

28. A method as claimed in claim 22, wherein said resource data of said packed computer file specifies for each resource item a size of said resource item.

29. A method as claimed in claim 22, wherein said generated fingerprint data includes timestamp data indicative of a time of compilation of said known computer program.

30. A method as claimed in claim 22, wherein said packed computer file includes an unpacking computer program which upon execution decompresses said known computer program.

31. A method as claimed in claim 22, wherein said packed computer file is a Win32 PE file.

32. A method of controlling a computer to generate data for detecting a known computer program within a packed computer file, said packed computer file being unpacked upon execution, said method comprising the steps of:
  reading resource data within said packed computer file, said resource data specifying program resource items used by said known computer program and readable by a computer operating system without dependence upon which unpacking algorithm is used by said packed computer file; and
  generating characteristic data associated with said resource data for comparison with characteristic data of known computer program resource data and detecting a match with said known computer program indicative of said packed computer file containing said known computer program;
  wherein said resource data of said packed computer file is processed to generate fingerprint data and to compare said generated fingerprint data with known computer program fingerprint data;
  wherein said generated fingerprint data includes a number of program resource items specified within said resource data of said packed computer file;
  wherein said generated fingerprint data includes a flag indicating which data is included within said generated fingerprint data;

wherein said generated fingerprint data includes a location within said resource data of said packed computer file of an entry specifying a program resource item having a largest size;

wherein said generated fingerprint data includes a checksum value calculated in dependence upon:

a number of program resource items specified beneath each node within hierarchically arranged resource data of said packed computer file;

string names associated with program resource items within said resource data of said packed computer file; and sizes of program resource items within said resource data of said packed computer file;

wherein said checksum value is rotated between each item being added into said checksum.

33. A method as claimed in claim 32, wherein said known computer program is one of:

a Trojan computer program; and a worm computer program.

34. A method as claimed in claim 32, wherein said step of generating generates characteristic data from a plurality of known computer programs to enable detection of any of said plurality of known computer programs within said packed computer file.

35. A method as claimed in claim 32, wherein said program resource items used by said known computer program include one or more of:

icon data;

string data;

dialog data;

bitmap data;

menu data; and language data.

36. A method as claimed in claim 32, wherein said resource data of said packed computer file specifies for each resource item a storage location of said resource item.

37. A method as claimed in claim 36, wherein said storage location of said resource item is specified as an relative offset value.

38. A method as claimed in claim 32, wherein said resource data of said packed computer file specifies for each resource item a size of said resource item.

39. A method as claimed in claim 32, wherein said generated fingerprint data includes timestamp data indicative of a time of compilation of said known computer program.

40. A method as claimed in claim 32, wherein said packed computer file includes an unpacking computer program which upon execution decompresses said known computer program.

41. A method as claimed in claim 32, wherein said packed computer file is a Win32 PE file.

42. Apparatus for detecting a known computer program within a packed computer file, said packed computer file being unpacked upon execution, said apparatus comprising:

a resource data reader operable to read resource data within said packed computer file, said resource data specifying program resource items used by said known computer program and readable by a computer operating system without dependence upon which unpacking algorithm is used by said packed computer file; and a resource data comparator for generating characteristics of said resource data and for comparing said characteristics of said resource data with characteristics of known computer program resource data for detecting a match with said known computer program indicative of said packed computer file containing said known computer program;

wherein said resource data of said packed computer file is processed to generate fingerprint data and to compare said generated fingerprint data with known computer program fingerprint data;

wherein said generated fingerprint data includes a number of program resource items specified within said resource data of said packed computer file;

wherein said generated fingerprint data includes a flag indicating which data is included within said generated fingerprint data;

wherein said generated fingerprint data includes a location within said resource data of said packed computer file of an entry specifying a program resource item having a largest size;

wherein said generated fingerprint data includes a checksum value calculated in dependence upon:

a number of program resource items specified beneath each node within hierarchically arranged resource data of said packed computer file;

string names associated with program resource items within said resource data of said packed computer file; and sizes of program resource items within said resource data of said packed computer file;

wherein said checksum value is rotated between each item being added into said checksum.

43. Apparatus as claimed in claim 42, wherein said known computer program is one of:

a Trojan computer program; and a worm computer program.

44. Apparatus as claimed in claim 42, wherein said resource data comparator is operable to compare said resource data of said packed computer file with characteristics of a plurality of known computer programs to detect if said packed computer program contains one of said plurality of known computer programs.

45. Apparatus as claimed in claim 42, wherein said program resource items used by said known computer program include one or more of:

icon data;

string data;

dialog data;

bitmap data;

menu data; and language data.

46. Apparatus as claimed in claim 42, wherein said resource data of said packed computer file specifies for each resource item a storage location of said resource item.

47. Apparatus as claimed in claim 46, wherein said storage location of said resource item is specified as an relative offset value.

48. Apparatus as claimed in claim 42, wherein said resource data of said packed computer file specifies for each resource item a size of said resource item.

49. Apparatus as claimed in claim 42, wherein said generated fingerprint data includes timestamp data indicative of a time of compilation of said known computer program.

50. Apparatus as claimed in claim 42, wherein said packed computer file includes an unpacking computer program which upon execution decompresses said known computer program.

51. Apparatus as claimed in claim 42, wherein said packed computer file is a Win32 PE file.

52. Apparatus for generating data for detecting a known computer program within a packed computer file, said packed computer file being unpacked upon execution, said apparatus comprising:
- a resource data reader for reading resource data within said packed computer file, said resource data specifying program resource items used by said known computer program and being readable by a computer operating system without dependence upon which unpacking algorithm is used by said packed computer file; and
- a characteristic data generator for generating characteristic data associated with said resource data for comparison with characteristic data of known computer program resource data and for detecting a match with said known computer program indicative of said packed computer file containing said known computer program;
- wherein said resource data of said packed computer file is processed to generate fingerprint data and to compare said generated fingerprint data with known computer program fingerprint data;
- wherein said generated fingerprint data includes a number of program resource items specified within said resource data of said packed computer file;
- wherein said generated fingerprint data includes a flag indicating which data is included within said generated fingerprint data;
- wherein said generated fingerprint data includes a location within said resource data of said packed computer file of an entry specifying a program resource item having a largest size;
- wherein said generated fingerprint data includes a checksum value calculated in dependence upon:
- a number of program resource items specified beneath each node within hierarchically arranged resource data of said packed computer file;
- string names associated with program resource items within said resource data of said packed computer file; and
- sizes of program resource items within said resource data of said packed computer file;
- wherein said checksum value is rotated between each item being added into said checksum.

53. Apparatus as claimed in claim 52, wherein said known computer program is one of:
- a Trojan computer program; and
- a worm computer program.

54. Apparatus as claimed in claim 52, wherein said characteristic data generator is operable to generate characteristic data from a plurality of known computer programs to enable detection of any of said plurality of known computer programs within said packed computer file.

55. Apparatus as claimed in claim 52, wherein said program resource items used by said known computer program include one or more of:
- icon data;
- string data;
- dialog data;
- bitmap data;
- menu data; and
- language data.

56. Apparatus as claimed in claim 52, wherein said resource data of said packed computer file specifies for each resource item a storage location of said resource item.

57. Apparatus as claimed in claim 56, wherein said storage location of said resource item is specified as an relative offset value.

58. Apparatus as claimed in claim 52, wherein said resource data of said packed computer file specifies for each resource item a storage location of said resource item.

59. Apparatus as claimed in claim 52, wherein said generated fingerprint data includes timestamp data indicative of a time of compilation of said known computer program.

60. Apparatus as claimed in claim 52, wherein said packed computer file includes an unpacking computer program which upon execution decompresses said known computer program.

61. Apparatus as claimed in claim 52, wherein said packed computer file is a Win32 PE file.

* * * * *

UNITED STATES PATENT AND TRADEMARK OFFICE
CERTIFICATE OF CORRECTION

PATENT NO. : 7,421,587 B2  Page 1 of 1
APPLICATION NO. : 09/912389
DATED : September 2, 2008
INVENTOR(S) : Cowie et al.

It is certified that error appears in the above-identified patent and that said Letters Patent is hereby corrected as shown below:

In the claims:
col. 11, line 56 replace "operable to read" with --for reading--;
col. 12, line 39 replace "program" with --file--;
col. 13, line 8 delete "being" before "readable" and after "and".

Signed and Sealed this

Ninth Day of February, 2010

David J. Kappos
*Director of the United States Patent and Trademark Office*